United States Patent
Thomas et al.

(10) Patent No.: US 8,391,932 B2
(45) Date of Patent: Mar. 5, 2013

(54) APPARATUS PROVIDING PLURAL WIRELESS TRANSCEIVERS WITHIN A DESIRED POWER BUDGET AND ASSOCIATED METHOD

(75) Inventors: John W. Thomas, Carlsbad, CA (US); Richard Thomas Kavanaugh, Encinitas, CA (US); David Eugene Theobald, Oceanside, CA (US); Jean Philippe Kielsznia, Redwood City, CA (US); Bhaskar S. Vadathavoor, San Diego, CA (US); Gustav Gerald Vos, Surrey (CA); Kevin Russell Coates Lloyd, Poway, CA (US)

(73) Assignee: Sierra Wireless, Inc., Richmond, British Columbia (CA)

( * ) Notice: Subject to any disclaimer, the term of this patent is extended or adjusted under 35 U.S.C. 154(b) by 475 days.

(21) Appl. No.: 12/711,067

(22) Filed: Feb. 23, 2010

(65) Prior Publication Data
US 2010/0216524 A1   Aug. 26, 2010

Related U.S. Application Data

(60) Provisional application No. 61/154,677, filed on Feb. 23, 2009.

(51) Int. Cl.
*H04B 1/38* (2006.01)
(52) U.S. Cl. ......... 455/574; 348/734
(58) Field of Classification Search .......... 455/574, 455/343.1, 41.1, 550.1, 334; 348/734
See application file for complete search history.

(56) References Cited

U.S. PATENT DOCUMENTS

| | | | |
|---|---|---|---|
| 6,104,759 A | 8/2000 | Carkner et al. | |
| 6,178,514 B1 | 1/2001 | Wood | |
| 6,600,726 B1 | 7/2003 | Nevo et al. | |
| 6,894,988 B1 | 5/2005 | Zehavi | |
| 6,990,082 B1 | 1/2006 | Zehavi et al. | |
| 7,035,596 B2 | 4/2006 | Sato | |
| 7,106,569 B2 | 9/2006 | Liu et al. | |
| 7,190,679 B2 | 3/2007 | Khawand et al. | |
| 7,239,615 B2 | 7/2007 | Nevo et al. | |
| 7,308,611 B2 | 12/2007 | Booth | |
| 7,321,750 B2 | 1/2008 | Bergveld et al. | |
| 7,343,175 B2 | 3/2008 | Liu et al. | |
| 7,395,038 B2 | 7/2008 | McCune | |
| 7,420,936 B2 | 9/2008 | Nevo et al. | |
| 2002/0025839 A1 | 2/2002 | Usui | |
| 2003/0081579 A1 | 5/2003 | Tosey et al. | |
| 2004/0023680 A1 | 2/2004 | Hulvey | |
| 2005/0136865 A1 | 6/2005 | Dupuis | |
| 2006/0063489 A1* | 3/2006 | Akaike et al. ........ 455/41.2 |
| 2007/0032265 A1 | 2/2007 | Park | |

(Continued)

FOREIGN PATENT DOCUMENTS

| | | |
|---|---|---|
| CN | 101291487 A | 10/2008 |
| CN | 101360075 A | 2/2009 |

(Continued)

*Primary Examiner* — Phuoc Doan
(74) *Attorney, Agent, or Firm* — Mintz, Levin, Cohn, Ferris, Glovsky and Popeo, P.C.

(57) ABSTRACT

The present invention provides an apparatus providing plural wireless transceivers within a desired power budget and associated methods. A plurality of wireless communication modules, each having a lower-power state and a higher-power state are provided, drawing power from a common source. Arbitration is performed to control which of the plurality of wireless communication modules are in the higher-power state, thereby controlling total power delivered by the power source to the plurality of wireless communication modules.

35 Claims, 12 Drawing Sheets

U.S. PATENT DOCUMENTS

| | | |
|---|---|---|
| 2007/0035895 A1 | 2/2007 | Liu et al. |
| 2007/0060089 A1 | 3/2007 | Owen et al. |
| 2007/0142007 A1 | 6/2007 | Yan |
| 2008/0032643 A1 | 2/2008 | Liu et al. |
| 2008/0102765 A1 | 5/2008 | Louks et al. |
| 2008/0139129 A1 | 6/2008 | Grillo et al. |
| 2008/0141051 A1 | 6/2008 | Lee et al. |
| 2008/0159182 A1 | 7/2008 | Tu et al. |
| 2008/0182531 A1 | 7/2008 | Lagnado et al. |
| 2009/0128714 A1 * | 5/2009 | Taya .............................. 348/734 |

FOREIGN PATENT DOCUMENTS

| | | |
|---|---|---|
| WO | WO/2008/054896 | 5/2008 |

* cited by examiner

A

B

Pre-emptive Priority:

State Transition Table:

|  | | Subsequent State | | | | | | |
|---|---|---|---|---|---|---|---|---|
| Current State | (S,S,S) | (S,S,T) | (S,T,S) | (S,T,T) | (T,S,S) | (T,S,T) | (T,T,S) | (T,T,T) |
| (S,S,S) | 1 | 1 | 1 | 0 | 1 | 0 | 0 | 0 |
| (S,S,T) | 1 | 1 | 0 | 0 | 1 | 0 | 0 | 0 |
| (S,T,S) | 1 | 0 | 1 | 0 | 1 | 0 | 0 | 0 |
| (S,T,T) | 1 | 1 | 1 | 0 | 1 | 0 | 0 | 0 |
| (T,S,S) | 1 | 0 | 0 | 0 | 1 | 0 | 0 | 0 |
| (T,S,T) | 1 | 1 | 1 | 0 | 1 | 0 | 0 | 0 |
| (T,T,S) | 1 | 1 | 1 | 0 | 1 | 0 | 0 | 0 |
| (T,T,T) | 1 | 1 | 1 | 0 | 1 | 0 | 0 | 0 |

850

States:

(a, b, c) = collective state (Module 1, Module 2, Module 3)
S = Standby
T = Transmit

Transitions:

1 = permitted
0 = prohibited

APPARATUS PROVIDING PLURAL WIRELESS TRANSCEIVERS WITHIN A DESIRED POWER BUDGET AND ASSOCIATED METHOD

CROSS REFERENCE TO RELATED APPLICATIONS

The present application claims priority under 35 U.S.C. §119 to U.S. Provisional Application Ser. No. 61/154,677, filed Feb. 23, 2009, entitled "APPARATUS PROVIDING PLURAL WIRELESS TRANSCEIVERS WITHIN A DESIRED POWER BUDGET AND ASSOCIATED METHOD" the disclosure of which is incorporated herein by reference.

FIELD OF THE INVENTION

The present invention pertains in general to wireless communications and in particular to an apparatus providing plural wireless transceiver capabilities within a desired power budget, and associated methods.

BACKGROUND

As the field of wireless communications develops, various wireless communication standards or protocols continue to be deployed. At a given location, it is becoming increasingly likely that one or more wireless networks are available for use, accessible via one of a variety of communication protocols. For example, Wi-Fi, Wi-MAX, CDMA, GSM, UMTS, and other communication protocols are currently available for use in connecting with different networks in locations worldwide. Moreover, in some locations, a choice of wireless networks operating with multiple communication protocols may be available.

To facilitate mobility of wireless devices, or to take advantage of the availability of multiple communication protocols in a given location, is often desirable to provide wireless communication devices operable using more than one wireless communication protocol. For example, a "dual mode" device capable of communication using both CDMA and GSM can be useful in diverse geographical areas where the different protocols are used. As another example, a device capable of communication using both CDMA and Wi-MAX may take advantage of the benefits of each protocol, and may select between protocols when both are available. Challenges for creating such multi-mode devices include cost, size, performance, and power constraints.

One approach to providing a wireless device capable of using more than one protocol is to utilize reconfigurable radio modules within the wireless device. Such modules may contain common hardware components which can be reconfigured as required to operate according to a desired communication protocol, for example as described in U.S. Pat. No. 7,035,596. However, such generic, reconfigurable components typically behave poorly with respect to indicators such as performance and cost. In addition, reconfiguration operations may require additional time, further reducing overall performance of the wireless device.

Another approach is to incorporate plural single-mode wireless communication modules into a wireless communication device. For example, multi-mode wireless handsets have been proposed which provide seamless hand-off of voice sessions between Wi-Fi and cellular networks. Use of such single-mode wireless communication modules may provide a cost savings due to their relative simplicity and availability in the marketplace. However, incorporating plural single-mode communication modules into a common wireless device may cause operating problems when there are power limitations. For example, operation of more than one wireless communication module at a time typically requires increased power, which may be above rated power limitations, thereby causing functional problems and/or device damage. Such limitations are apparent, for example in wireless adapters having a universal serial bus (USB™) interface, where simultaneous operation of plural single-mode wireless communication modules may result in a current draw to the wireless adapter greater than the maximum rated current specified for the associated USB™ bus.

Therefore there is a need for an apparatus providing plural wireless communication capabilities that is not subject to one or more limitations in the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an apparatus providing plural wireless transceivers within a desired power budget and associated methods. In accordance with an aspect of the present invention, there is provided a wireless communication apparatus comprising: a plurality of wireless communication modules, each of the plurality of wireless communication modules having a lower-power state and a higher-power state; a power source operatively coupled to the plurality of wireless communication modules for delivering power thereto; and an arbitration module operatively coupled to the plurality of wireless communication modules, the arbitration module configured to control which of the plurality of wireless communication modules are in the higher-power state, thereby controlling total power delivered by the power source to the plurality of wireless communication modules.

In accordance with another aspect of the present invention, there is provided a method for providing a plurality of wireless communication capabilities within a desired power budget, the method comprising: providing a plurality of wireless communication modules associated with the plurality of wireless communication capabilities, each of the plurality of wireless communication modules having at least a lower-power state and a higher-power state, each of the plurality of wireless communication modules operatively coupled to a power source to receive power therefrom; and controlling which of the plurality of wireless communication modules are in the higher-power state, thereby controlling total power delivered by the power source to the plurality of, wireless communication modules.

In accordance with another aspect of the present invention, there is provided a computer program product comprising a computer readable medium having recorded thereon statements and instructions for execution by a computer to carry out a method for operating a plurality of wireless communication capabilities, each of the plurality of wireless communication modules operatively coupled to a power source to receive power therefrom, the method comprising: controlling which of the plurality of wireless communication modules are in a higher-power state and controlling which of the plurality of wireless communication modules are in a lower-power state, thereby controlling total power delivered by the power source to the plurality of wireless communication modules.

BRIEF DESCRIPTION OF THE FIGURES

These and other features of the invention will become more apparent in the following detailed description in which reference is made to the appended drawings.

DETAILED DESCRIPTION OF THE INVENTION

Definitions

Figure 1:
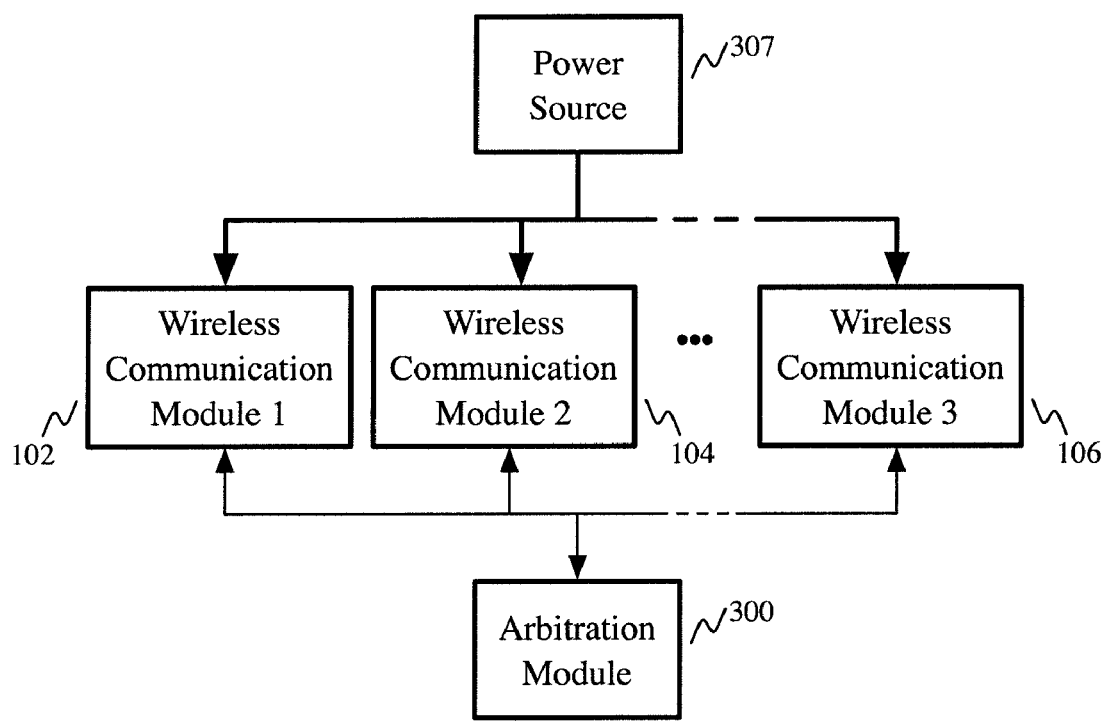
FIG. 1 illustrates an apparatus for providing plural wireless communication modules within a desired power budget in accordance with embodiments of the invention.

The term "power" as used herein refers to an amount of energy flow per unit of time. For example, average or instantaneous electrical power may be measured in Watts, and may be associated with the product of average or instantaneous potential difference measured in Volts and average or instantaneous current measured in Amperes.

The term "power budget" as used herein refers to a set of one or more upper limits on flow of instantaneous power, one or more average amounts of power, or a combination thereof. The flow of power is understood to be from or to an associated device or portion thereof. Average amounts of power flow may include short-term averages, long-term averages, or a combination thereof. The power budget may represent a sum total of allowable instantaneous and/or average power flowing to specified components of the associated device. A power budget may be static, dynamic, device-defined or user-defined.

As used herein, the term "about" refers to a ±10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for controlling plural wireless transceiver or communication capabilities within a predetermined power budget. In accordance with an aspect of the present invention, there is provided a wireless communication apparatus comprising a plurality of wireless communication modules, a power source, and an arbitration module. Each of the plurality of wireless communication modules has a lower-power state and a higher-power state. For example, one lower-power state may be a receive-only state, wherein the module consumes little power but does not operate as a transmitter. Furthermore one higher-power state may be a state wherein the module instead or additionally operates as a transmitter, thus consuming more power. The power source is operatively coupled to the plurality of wireless communication modules for delivering power thereto. Due to design constraints, the amounts of instantaneous and/or average power delivered by the power source are typically limited by a power budget, for example to predetermined maxima. It is recognized that it is desirable to provide means by which the communication modules can be controlled, for example such that their collective power draw or attempted power draw is in accordance with the power budget. The arbitration module is operatively coupled to the plurality of wireless communication modules substantially for this purpose. Specifically, the arbitration module is configured to control which of the plurality of wireless communication modules are in the higher-power state, thereby controlling total power delivered by the power source to the plurality of wireless communication modules.

In embodiments of the present invention, the arbitration module controls which of the plurality of wireless communication modules are in the higher-power state based at least in part on predetermined or reconfigurable prioritization rules when power draw is a concern. For example, when pending or ongoing communication operations can be performed within predetermined power constraints, the arbitration module typically allows such operations to proceed. However, when a requested combination of wireless communication module states, that is a requested collective state, would require more power than is specified in the power budget, the arbitration module prioritizes requests for operation in the higher-power state, such that some such requests are satisfied to a greater extent than others, the others for example remaining pending or denied, or being only partially satisfied. Prioritization rules may be configurable during operation and may vary in several respects, as described below. For example, pre-emptive, non pre-emptive, first-come first-served, fixed, variable, reconfigurable, and other types of prioritization rules can be implemented in embodiments of the present invention.

In one embodiment, the arbitration module may be operated or varied in accordance with a control schedule. For example, sharing of power resources in time may be accomplished by varying prioritization rules of the arbitration module so as to preferentially accommodate different wireless communication modules at different times. A control schedule may also be adjusted based on feedback indicative of observables such as queue length of pending communication packets for a wireless communication module, prior or anticipated future activity of wireless communication modules, active or standby status of wireless communication modules, type of traffic being handled by a wireless communication module, or the like.

In one embodiment, scheduling may be performed in conjunction with arbitration to coordinate communication operations, such as transfer of data from a host computing device to a wireless communication module, with power control operations, such as disposing wireless communication modules in appropriate lower or higher power states. Scheduling may comprise planning future prioritization rules, revising said plans, or a combination thereof. Static prioritization rules, or a dynamic schedule of prioritization rules, may be predetermined or determined during operation so as to allocate resources among wireless communication modules in accordance with a predetermined system performance criterion.

In one embodiment, the present invention is directed toward satisfying power budget requirements of a plug-in wireless adapter for use with a host computing device via a standardized interface such as a USB™, Firewire™, PCMCIA™, CardBus™, or the like. Each of the above interfaces is standardized with respect to the amount of power that can be delivered, and it is often required to work within these standards when providing a product. For example, the USB™ 2.0 specification requires that the USB™ bus be capable of delivering up to 2500 milliwatts (mW) of DC power, typically at 5 Volts (V) and up to 500 milliamperes (mA). Although some USB™ implementations may be capable of providing more power, adhering to the standard requirements can ensure that a device should be operable with any USB™ bus, without requiring an additional power source.

Referring to FIG. 1, embodiments of the present invention generally include a wireless communication apparatus coupled to a power source 307. The power source 307 is coupled to a plurality of wireless communication modules 102, 104, 106 for supplying power thereto. An arbitration module 300 is operatively coupled to the plurality of wireless communication modules 102, 104, 106, and is configured to ensure that these modules do not operate in a collective state which would result in more power being drawn from the power source 307 than is allowed for by a predetermined power budget. The arbitration module 300 may be configured for this purpose, for example by receiving requests from the wireless communication modules 102, 104, 106 whenever they attempt to change state, and indicating the requests as granted or denied based on current conditions and a predetermined set of rules as described herein. The power source may be coupled to the wireless communication apparatus through an external connector, such as a connection to a host computer also carrying data to the wireless communication modules 102, 104, 106.

Figure 2:
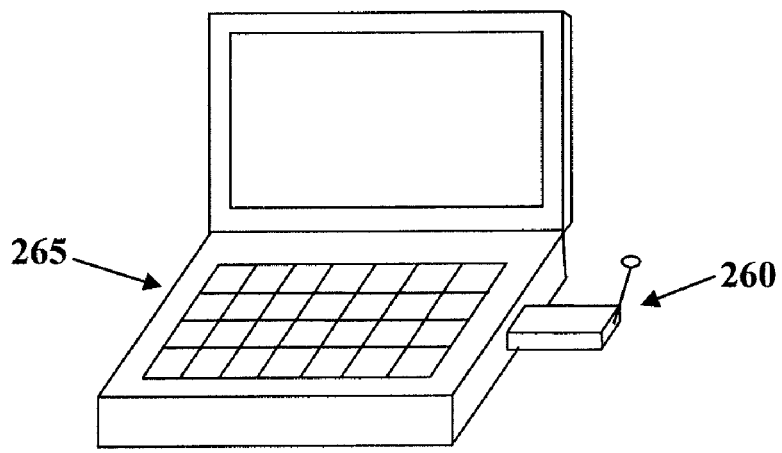
FIGS. 2A and 2B illustrate wireless communication apparatus coupled to a host computer system in accordance with embodiments of the invention.
Figure 2:
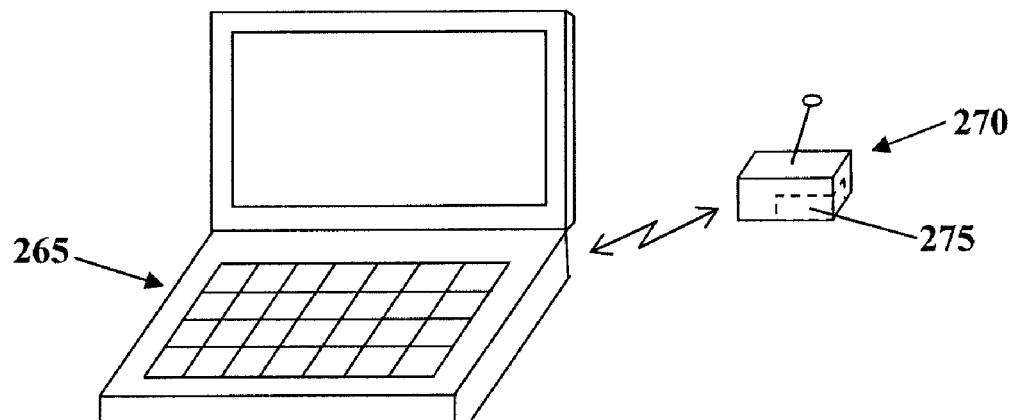

FIG. 2A illustrates a wireless communication apparatus as a plug-in wireless adapter 260 in accordance with embodiments of the invention. For example, the wireless adapter 260 can be plugged into a host computer system 265 via a USB™, PCMCIA, CardBus, Firewire™, or other connection. The host computer system 265 includes a power supply for providing a power source of the wireless adapter 260, for example via power and ground conductors of the plug-in connection. FIG. 2B illustrates a wireless communication apparatus as a remote wireless adapter 270 in accordance with embodiments of the invention. For example, the remote wireless adapter 270 has a self-contained power source 275 such as a battery, or battery terminals, and communicates with the host computer system 265 via a short-range wireless protocol such as infrared, Bluetooth™, Wireless Ethernet, or the like. Other embodiments (not shown) involve a wireless communication apparatus as an embedded component or set of components in a host system, such as a host computer system 265 or other type of host system, such as a personal digital assistant (PDA), cellular telephone, vehicle, or the like. In this case, the power source may be provided as a connection to a power supply bus of the host system.

Wireless Communication Module

Embodiments of the present invention provide for a plurality of wireless communication modules, each having a lower-power state and a higher-power state. For example, states of a wireless communication module may include one or more of: a powered down state, standby state, receive-only state, low-power transmit/receive state, and high-power transmit/receive state. Other states, such as one or more intermediate-power transmit/receive states, may also be included as would be readily understood by a worker skilled in the art. Lower-power and higher-power states may refer to any two of these states which draw relatively lower and higher amounts of power, respectively. For example, a lower-power state may refer to a powered down, standby, or reception-only state, while a higher-power state may refer to a transmit/receive state. As another example, lower-power and higher-power states may refer to transmit/receive states of varying power. The concurrent states of plural wireless communication modules are referred to as their collective state.

In some embodiments, one or more of the plurality of wireless communication modules includes a substantially pre-packaged or self-contained electronic component. For example, pre-packaged components may include wireless transceiver chips or chipsets, which are available for supporting wireless protocols, such as CDMA, UMTS, GSM, WWAN, WiMAX, Wi-Fi, Bluetooth, and the like. Pre-packaged components may also include logic components, power amplifiers, low-noise amplifiers, signal processors, microprocessors, analog-to-digital or digital-to-analog converters, or the like. In some embodiments, the pre-packaged components operate in conjunction with additional pre-packaged or non-pre-packaged components, such as processors, power amplifiers, antennas, frequency converters, or the like, to form a wireless communication module. Furthermore, in some embodiments, additional components are used to connect two or more wireless communication modules with a controlling computer or processor; such components may include a serial bus hub controller, a serial bus switch, a routing processor or the like.

Use of pre-packaged or self-contained components may be advantageous for several reasons. For example, using pre-packaged components may reduce design and manufacturing efforts, since fewer components are involved, and since the pre-packaged components typically have well-defined input/output characteristics. In addition, pre-packaged components dedicated to only one or a few wireless protocols may have improved performance characteristics, since they can be tailored to specific applications. Further, pre-packaged components may offer a cost savings due to the economics of mass production.

In embodiments, a wireless communication module can comprise protocol-specific components such as pre-packaged chips, coupled to additional components such as a pre-packaged or self-contained power amplifier for amplifying signals to be transmitted, and an antenna for receiving and transmitting the amplified signals. Since power amplifiers typically contain analog electronic components operating at relatively high power, it is currently typical design practice to provide these components separately from other electronic components.

In some embodiments, wireless communication modules may comprise components which are shared by plural wireless communication modules, dedicated components which are used only by a particular wireless communication module, or a combination thereof.

Wireless communication protocol standards, such as CDMA, GSM, Wi-Fi, WiMAX, or other standards governing wireless networks such as wireless LANs and cellular telephone networks, often specify the radio power levels at which wireless transceivers are desired or required to operate for wirelessly transmitting information. When two or more wireless communication modules share the same power source, care must be taken to ensure each module conforms to their wireless communication protocol standard, while also ensuring that the specified maximum power of the power source or power connection is not exceeded. For example, if more than one wireless communication module were to transmit at the same time, the specified maximum power could be exceeded in some cases.

In one embodiment, advantage is taken of the presence of a separately provided power amplifier in a wireless communication module by enabling or disabling the power amplifier to provide higher-power and lower-power states, respectively. Therefore, transmission may be possible in the higher-power state but not in the lower-power state. An advantage of this embodiment is that control of power consumption of the wireless communication modules is enabled based substantially on control of the power amplifiers. This may be advantageous, for example, if power control capabilities are not otherwise easily available for self-contained or pre-packaged chipsets. In addition, since power amplifiers are typically among the highest power consumers in a wireless transceiver, this approach may enable substantial control of power consumption in embodiments of the present invention.

In one embodiment, a wireless communication module or components thereof, such as a power amplifier, can be operable with a continuously or discretely variable power consumption. For example, a wireless radio signal can be transmitted at lower power or higher power, depending on the amount of power available at the power amplifier. As another example, reception of a wireless signal can be performed at lower power or higher power, depending on the amount of power provided to components such as a low-noise amplifier. Such continuously or discretely variable power consumption may be used to provide lower-power and higher-power states of the wireless communication module. Varying the amount of power used in transmission, reception, or both may affect characteristics such as signal-to-noise ratio, duty cycle, transmission schedule, transmission rate, transmission range, or a combination thereof, as would be readily understood by a worker skilled in the art.

Power consumption of components of a wireless communication module may be variable, for example, by switching or varying current drawn thereby. For example, current drawing loads within a wireless communication module may be effectively connected or disconnected from the power source by actuating a transistor or MEMS switch, thereby varying the impedance and power drawn by the load. Power drawn by a load may be further regulated by controllable current sources which limit instantaneous current or average current, for example via pulse-width modulation, set point tracking, feedback control, or the like, or a combination thereof.

Power Source

Embodiments of the present invention provide for a power source operatively coupled to a plurality of wireless communication modules for delivering power thereto. For example, the power source can be equipped to substantially continuously provide DC power at a predetermined nominal voltage to the plurality of wireless communication modules, such that the total power or current supplied to the wireless communication modules is within a predetermined power budget.

In one embodiment, the power source resides on a host computer, while the wireless communication apparatus is provided as a device connectible to the host computer via a special-purpose or standardized interface. Power is provided to the wireless communication apparatus from the host computer, via the interface. For example, a wireless USB™ adapter can be provided for use with a host computer such as a laptop via a USB™ interface in this manner.

In embodiments of the present invention, data signals are provided between the host computer and the wireless communication apparatus, thereby enabling the host computer to communicate via the wireless communication apparatus. For example, a wireless adapter may be communicatively coupled to a special- or general-purpose host computer in this manner. In a further embodiment, the wireless adapter and host computer are communicatively coupled by a USB™ interface which also provides power to the wireless adapter. Other potential interfaces include Firewire™, PCMCIA™, CardBus™, and the like.

In embodiments of the present invention, the power source may be operatively coupled with the wireless communication apparatus and/or wireless communication modules in a variety of ways, as would be readily understood by a worker skilled in the art. For example, direct electrical coupling off of a power bus, inductive coupling, coupling through a transformer, isolating transformer, autotransformer or filter, or coupling involving other intermediate power electronic devices can be provided for in various embodiments of the present invention. Switches, transistors, diodes, or the like may also be used to control portions of the electrical couplings, such as pathways, voltages and currents.

Typically, a power source and associated power transmission lines are limited with respect to the instantaneous and/or average amounts of power that can be provided. Exceeding these limits may result in damage or protective disconnection of the power source from all or part of its load, for example one or more wireless communication modules or other devices operatively coupled to the power source. To provide performance guarantees or enable multiple loads to share a power source, standardized interfaces providing power typically specify how much power should be available, and how much power should be drawn by each device or load connected to the interface. In some instances, power consumption can be actively managed. For example, USB™ 2.0 devices are by default restricted to drawing 100 mA of current at 5 V, but can request to draw up to 500 mA of current at 5 V if such power is not already reserved for other devices.

Arbitration Module

Embodiments of the present invention provide for an arbitration module configured to control which of the plurality of wireless communication modules are in the higher-power state. The arbitration module can thereby control total power delivered by the power source to the plurality of wireless communication modules, allowing the wireless communication apparatus to respect predetermined power consumption requirements, for example in accordance with a desired power budget.

In embodiments of the present invention, controlling total power delivered by the power source to the plurality of wireless communication modules includes restricting the collective states of the wireless communication modules to a subset of possible collective states. The subset satisfies the condition that the total average or instantaneous power required by all wireless communication modules in each collective state belonging to the subset is less than or equal to predetermined maxima in accordance with a predetermined power budget. For example, for N wireless communication modules, each operable in one of A states, there are $A^N$ possible collective states. Of these, the subset may contain $M<A^N$ collective states. These M collective states exclude at least all collective states which require more power than the predetermined maxima, for example the collective state wherein all of the modules are in the higher-power state.

In one embodiment, the arbitration module can receive requests from one or more of the plurality of wireless communication modules to enter new states, and hence a new collective state, which the arbitration module can then grant or deny, depending on whether the new states would result in a collective state belonging to the aforementioned allowed subset or not.

In one embodiment, requests by a wireless communication module to transition from a higher-power state to a lower-power state are automatically granted, since such requests will not typically increase power consumption. In another embodiment, transitions from a higher-power to a lower-power state can be regarded as being executed without the requirement of an explicit request or substantial arbitration activities.

In one embodiment, generating and granting of requests is performed automatically by operation of electronic circuitry. Such electronic circuitry may contain components such as Boolean logic components, latching circuits, or the like, or a combination thereof. Use of electronic circuitry may enable providing an arbitration module having substantially low complexity.

In one embodiment, the arbitration module may be configured to allow short-term operation of the wireless communication modules in a collective state that would not be allowed over a longer period of time. For example, two wireless communication modules may simultaneously be permitted to transmit and receive in a higher-power state for a predetermined period of time so as to facilitate seamless handoff of a voice or data session. Such a configuration may be used when the power source is capable of handling short-term over-current conditions without damage or when the power distribution contains an energy-storage device, such as a capacitor. The predetermined period of time can therefore be limited by the specifications of the power source and power distribution system, such that over-current conditions do not persist for longer than that which the power source can handle. This may also include providing a predetermined recovery time between over-current conditions. Such temporary over-current conditions and recovery times may be specified as part of a predetermined power budget.

In one embodiment, the arbitration module may operate to satisfy both short-term and long-term power budget requirements. For example, suppose the power budget allows for a short-term total power draw of x mA, and a long-term total power draw of y mA, where x>y. Suppose further that a request for operation of a wireless communication module would result in z mA of power draw, where z<x but z>y. Then the request may be granted in the short term, but re-evaluated in the long term. For example, after a predetermined amount of time, a lower-priority wireless communication module may be forced out of a higher-power state to accommodate the long-term power budget requirements.

In one embodiment, each wireless communication module includes a power amplifier, and the arbitration module may function by allowing a subset of the power amplifiers to be enabled at a time. For example, the arbitration module may allow one, two, or more power amplifiers to be enabled at a time. If different power amplifiers draw substantially different powers, the arbitration module may be configured to allow a subset of power amplifiers to be concurrently enabled if such enablement does not result in power draw in violation of the power budget.

According to embodiments of the present invention, the arbitration module includes specialized or general-purpose hardware, software and/or firmware. In one embodiment, portions of the arbitration module can be functionally represented as a Boolean logic network, for example including request inputs from the plurality of wireless communication modules for requesting desired states, and enable outputs for controlling the desired states of the wireless communication modules based on the current states and requests thereof. Portions of the arbitration module can additionally or alternatively be represented in other ways, for example by lookup tables, ladder logic, mathematical formulas, finite state machines, systems of queues, or the like. A worker skilled in the art would readily understand how to implement such representations. For example, Boolean logic and other functions can be implemented using special purpose or off-the-shelf components, such as discrete logic chips, field-programmable gate arrays (FPGAs), application specific integrated circuits (ASICs), programmable logic devices (PLDs), memory components such as electronically erasable programmable read-only memory (EEPROM), Flash memory, and the like. Microcontrollers or microprocessors, along with instructions held in memory for controlling operation thereof, can also be used to enable portions of the arbitration module, such as Boolean logic, finite state machines, queues, or the like.

In some embodiments, the arbitration module may be at least in part integral with one or more wireless communication modules. For example, if a first wireless communication module, operating in a higher-power state, receives information indicative that a second wireless communication module is expected to switch from a lower-power state to a higher-power state, the first wireless communication module may switch itself to a lower-power state, inhibit the second wireless communication module from switching to a higher-power state, or a combination thereof, or the like. The second wireless communication module may operate similarly with respect to the first wireless communication module. The arbitration module may thereby be effected at least in part by the configuration of one or more wireless communication modules, for example in accordance with operational rules thereof.

In some embodiments, the arbitration module may be configured to limit the maximum power drawn by a first wireless communication module during substantially concurrent operation of a second wireless communication module. For example, when the first wireless communication module is involved in active communication, such as involving active transmission and/or reception of data, and a second wireless communication module is involved in non-active operations, such as radio scanning, the arbitration module may impose a limit on the power consumed by the first wireless communication module. Radio scanning may comprise, for example, operating a radio receiver to determine the presence, strength and/or content of radio signals in one or more sequentially selected frequency bands. As an example, a first wireless communication module operating in accordance with a 3G protocol may perform active communication while a second wireless communication module operating in accordance with a 4G protocol may perform radio scanning operations, or vice-versa.

Limiting power consumption may be performed in various ways. For example, limiting power consumption may comprise limiting power supplied to a power amplifier of the first wireless communication module. As another example, the first wireless communication module may be associated with one or more maximum transmit power limits, for example one transmit power level for each of a plurality of communication frequency bands or band classes associated with the first wireless communication module, and limiting power consumption may comprise configuring each of these maximum transmit power limits. As yet another example, the first wireless communication module may be put into a dormant or idle mode while the second wireless communication module is operated. Power consumption limits may be configured so as to respect a predetermined power budget. Power consumption limits may be removed or relaxed after operations by the second wireless communication module are completed.

As an example, in one embodiment, a first wireless communication module may comprise a CDMA radio, or the like, and a second wireless communication module may comprise a WiMAX radio, or the like. The apparatus and power budget may be such that operation of the CDMA radio, with a total current draw not exceeding a first upper limit, such as 400 mA, may be performed substantially concurrently with scanning operations of the WiMAX radio, with a current draw not exceeding a second upper limit, such as 250 mA. The first and second wireless communication modules may thus be operated substantially concurrently in at least one collective state, within a power budget such as corresponding to a current draw of 650 mA. In some embodiments, the CDMA radio total current draw may be limited at least in part by limiting one or more maximum transmission power levels for one or more communication bands. For example, one or more bands such as Cell 1013, Cell 384, Cell 777, PCS 25, PCS 1175, PCS 600, may each be limited to a maximum transmission power level such as 18 dBm. Maximum transmission power levels may be the same or different for each band, provided that the power budget is respected.

Prioritization

In one embodiment, when transmission is required, the power amplifier of a wireless communication module is first enabled by setting an enable input thereof to a logical '1' or '0' level in accordance with the specifications of the power amplifier. A portion of the wireless communication module can initiate a request to the arbitration module to set the enable input of the power amplifier corresponding to that module. Based on the current state of request and enable signals for all wireless communication modules, for example, the arbitration module can grant or deny the request.

In embodiments of the present invention, requests from different wireless communication modules can be prioritized. For example, if two or more wireless communication modules make requests to enter states that would result in their collective state being outside the subset of allowed collective states, then the request of the communication module which is attributed highest priority may be granted first, optionally followed by lower priority requests if possible. Prioritization may be performed by the arbitration module in accordance with prioritization rules. Prioritization rules may be fixed or pre-programmed, or may be configurable, for example based on one or more prioritization configuration inputs carrying signals for adjusting the prioritization rules.

In one embodiment, prioritization of requests can include pre-emptive prioritization. In pre-emptive prioritization, a request from a higher priority wireless communication module may be accommodated at the expense of a lower priority wireless communication module, by forcing the lower priority wireless communication module into a lower-power state. This may free up available power for the higher priority wireless communication module. Optionally, the lower priority wireless communication module can be prompted to resume its previous state once the higher priority device is finished with its requested state. Allowed short-term and long-term operations may be determined in accordance with aspects of a power budget.

According to one embodiment of the present invention, an arbitration module may control a plurality of wireless communication modules such that only one wireless communication module can be in a higher-power state at a time. For example the arbitration module can be configured to enable only one power amplifier at a time. The arbitration module may be further configured to prioritize enabling at least one wireless communication module over at least one other wireless communication module. For example, if a higher-priority wireless communication module signals a request to the arbitration module to enter a higher-power state, and a lower-priority module is already in its higher-power state, the arbitration module may grant the higher-priority request while disrupting the lower priority module and forcing it into a lower-power state. In one embodiment, this is performed by interlocking the enabling of the power amplifiers of the various wireless communication modules to prevent simultaneous operation of more than one power amplifier.

In one embodiment, prioritization of requests can include first-come first-served prioritization. In this case, requests by wireless communication modules are fulfilled in the order they occur, provided that fulfilling a request does not result in a collective state outside the allowed subset of collective states. When the collective state changes, pending requests that were previously blocked can be fulfilled. Optionally, pending requests can be fulfilled automatically or the wireless communication modules whose requests were previously blocked can be notified to submit a new request. Pending requests may also be queued and fulfilled automatically as power resources become available. In this manner, pending requests can be tracked and accommodated at a future time without disrupting current or ongoing communication activities of other wireless communication modules.

In one embodiment, prioritization of requests can include non-pre-emptive prioritization. In non-pre-emptive prioritization, a request from one wireless communication module does not result in immediate interruption of another wireless communication module, regardless of priority. However, when two or more requests are pending for wireless communication modules with different priorities, the higher priority request is fulfilled before the lower priority request, for example when the communication module currently in service transitions to a lower power state. In some embodiments, non-pre-emptive prioritization may be regarded in some instances as a combination of pre-emptive prioritization and first come first served prioritization. That is, pending requests may pre-empt each other, but are not fulfilled until an opportunity becomes available.

It is envisioned that other prioritization schemes can also be provided for by embodiments of the present invention. For example, prioritization based on queueing requests in single or multiple queues, prioritization including fairness considerations such as time-sharing, prioritizations based on finite state machine implementations, single or multi-round negotiations to establish priority, reservations of priorities for certain times, feedback loops, or the like, can be used.

Embodiments of the present invention may provide for fixed prioritization between wireless communication modules. For example, the arbitration module may always give priority to a wireless communication module handling voice communications over a wireless communication module primarily handling data communications. Likewise, a wireless communication module potentially handling system administration activities may always be given a higher or lower priority depending on the nature or importance of the activities. As another example, active or primary communication modules may be prioritized over standby or alternative communication modules. Prioritizations may be "hard wired" into the arbitration module when they are not intended to change.

Embodiments of the present invention may also provide for configurable prioritization between wireless communication modules. For example, prioritizations between wireless communication modules providing voice and data communication, or between wireless communication modules operating with different communication protocols, may vary according to user preferences, location, time of day, battery level, system administrator settings, or the like. Prioritization rules may be determined based on one or more prioritization configuration inputs. These inputs may determine an order in which wireless communication modules are to be prioritized, prioritization types, and the like. States of prioritization configuration inputs may be further determined based on user preferences or communication requirements, such as requirements to communicate via a wireless communication module once every t seconds, or requirements to maintain the size of a queue of packets to transmit below a certain threshold level.

Configurable prioritizations can be provided in one or more of a variety of ways. For example, the arbitration module may include a prioritization state indicator such as a register, memory location, one or more latched signals, or the like. Prioritization of one wireless communication module over another is controlled dynamically by the prioritization state indicator, which may be changed at any time. As another example, portions of the arbitration module dictating prioritization may be provided in a programmable device such as an FPGA, PLD, EEPROM, Flash memory, or the like. Reprogramming of the programmable device may be performed to change the prioritization rules of the arbitration module.

In one embodiment, the arbitration module operates based at least in part on a time-varying control schedule. The control schedule may specify dynamic prioritization parameters related to the wireless communication modules, for example. This may enable temporally-based sharing of power resources. The control schedule may further be determined based at least in part on communication requirements of wireless communication modules and/or information sources or information sinks operatively coupled thereto. For example, if a wireless communication module requires periodic communication to maintain a connection, the control schedule may be adjusted such that wireless communication module is prioritized for operation at least often enough to facilitate said periodic communication. As another example, the control schedule may be synchronized with periodic burst activity of an information source providing packets to a wireless communication module.

The invention will now be described with reference to specific examples. It will be understood that the following examples are intended to describe embodiments of the invention and are not intended to limit the invention in any way.

EXAMPLES

Example 1

Figure 3:
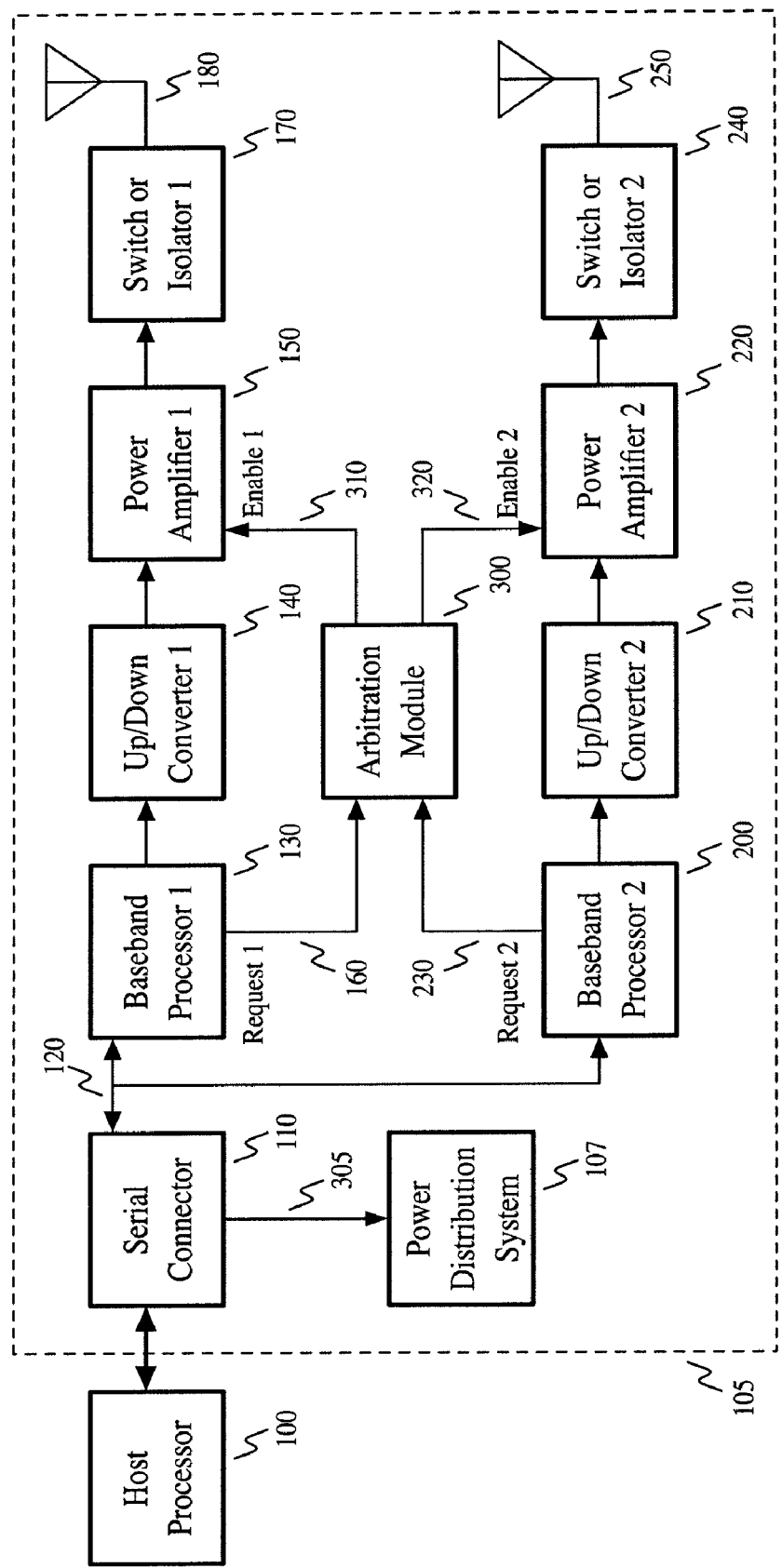
FIG. 3 illustrates an apparatus for providing plural wireless communication modules within a desired power budget in accordance with embodiments of the invention.

Referring to FIG. 3, embodiments of the invention includes a wireless communication apparatus 105 coupled through a connector 110 to a host computer 100, which may be a special or general-purpose computer. The connector 110, such as a USB™ connector, has a data path 120 through which data can be transferred via electrical contact or via optical transmission or via magnetic induction or via capacitive coupling or the like. Said connector 110 also has a power path 305 through which power for the wireless communication apparatus 105 is transferred from the host processor 100, via electrical contact or via magnetic induction, to a power distribution system 107, which supplies power to components of the wireless communication apparatus 105. In this embodiment, the power source resides on the host processor 100.

Continuing with respect to FIG. 3, a first wireless communication module may comprise a baseband processor 130, up/down converter 140, power amplifier 150, antenna switch or isolator 170, and antenna or antenna connector 180, while a second wireless communication module may comprise a baseband processor 200, up/down converter 210, power amplifier 220, antenna switch or isolator 240, and antenna or antenna connector 250. Alternatively, some components, such as antennas, may be shared between wireless communication modules. For transmission using the first wireless communication module, data from the serial connector 110 is passed to the baseband processor 130, which is configured to generate low-frequency modulated signals in accordance with a given wireless communication protocol. The modulated signal is passed to up-converter 140, which shifts the modulated signal to a higher frequency for transmission. The output of the up/down converter 140 is amplified using power amplifier 150, and the amplified signal is routed through antenna switch or coupler 170 to the antenna or antenna connector 180 for radio transmission. Transmission using the second wireless communication module occurs similarly, but using baseband processor 200, up/down converter 210, power amplifier 220, antenna switch or isolator 240, and antenna or antenna connector 250.

In other embodiments, more than two wireless communication modules may be provided in FIG. 3. In addition, receive signal paths (not shown) and reception operations may be provided for at least one of the wireless communication modules.

In other embodiments, data path 120 may connect to a serial bus hub controller, a serial bus switch, or a digital processor (not shown) that includes routing functionality to direct data to the appropriate baseband processor 130 or 200.

In embodiments of the invention, baseband processors 130 and 200 are configured to request higher-power transmission states when required by signalling requests to the arbitration module 300 using respective request connections 160 and 230, respectively. The arbitration module may then enable one of power amplifiers 150 or 220 in accordance with arbitration rules such as prioritization rules, via the appropriate enable connection 310 or 320.

As used herein, signals such as enable signals may be implemented in various ways as would be readily understood by a worker skilled in the art. For example, logical signals may be switched voltage or current signals indicative of a logical '0' or '1' state, for example. For example, a voltage level above 2 V may be indicative of a logical '1' state, while a voltage level below 2 V may be indicative of a logical '0' state.

Example 2

Figure 4:
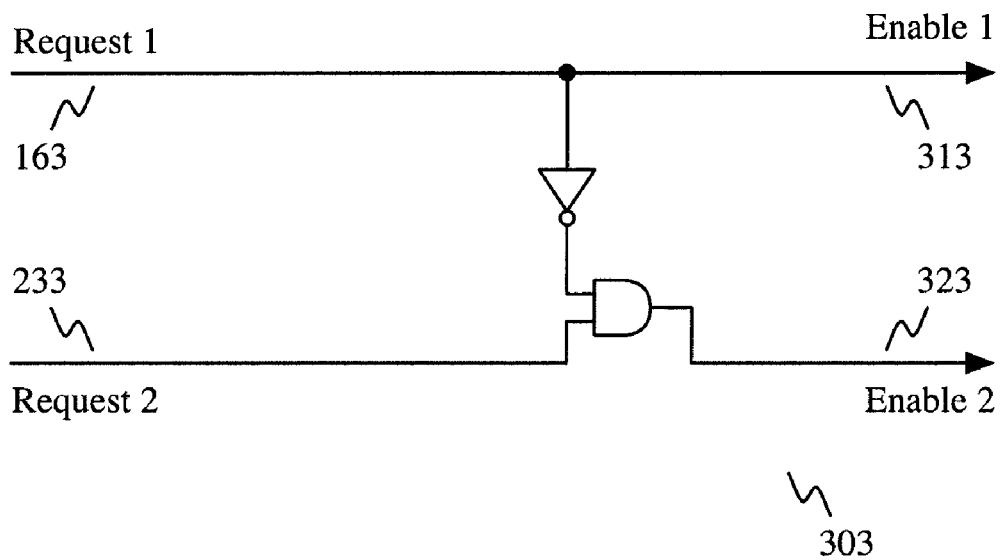
FIG. 4 illustrates a Boolean logic network of an arbitration module for controlling operation of wireless communication modules in accordance with one embodiment of the invention.

FIG. 4 illustrates a representation of the arbitration module 303 according to an embodiment of the present invention. The arbitration module 303 comprises digital logic that provides fixed pre-emptive prioritization of one wireless communication module over another. A logical level '1' at input 163 or 233 indicates a request by the first or second wireless communication module, respectively, to enable that wireless communication module to enter a higher-power state, for example by enabling the power amplifier thereof. A logical level '1' at output 313 or 323 indicates that the first or second wireless communication module is enabled to enter the higher-power state. As illustrated in FIG. 4, the first wireless communication module's request signal connection 163, if set to logical level '1', disables the second wireless communication module's enable connection 323 by forcing it to logical level '0'. Thus, the first wireless communication module has pre-emptive priority over the second wireless communication module. It will be obvious to those skilled in the art that many logic circuits will provide the equivalent logic function, including those using general-purpose electronics such as programmable logic device cells.

Example 3

Figure 5:
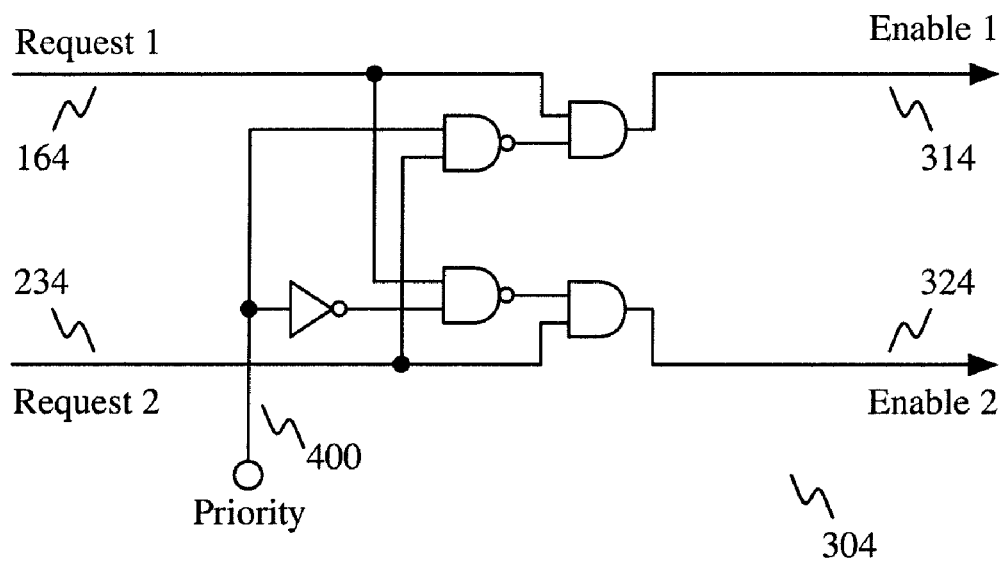
FIG. 5 illustrates a Boolean logic network of an arbitration module for controlling operation of wireless communication modules in accordance with an embodiment of the invention.

FIG. 5 illustrates representation of another arbitration module 304 according to an embodiment of the present invention. The arbitration module 304 comprises digital logic that allows pre-emptive prioritization rules for wireless communication modules to be controlled by a prioritization configuration input 400. Said prioritization configuration input 400, when set to logical level '0', results in the first wireless communication module having priority. In this case, the arbitration module operates similarly to that of Example 2. That is, a logical level '1' at input 164 or 234 indicates a request by the first or second wireless communication module, respectively, to enable that wireless communication module to enter a higher-power state, for example by enabling the power amplifier thereof. A logical level '1' at output 314 or 324 indicates that the first or second wireless communication module is enabled to enter the higher-power state. As illustrated in FIG. 4, the first wireless communication module's request signal connection 164, if set to logical level '1', disables the second wireless communication module's enable connection 324 by forcing it to logical level '0'.

Continuing with respect to FIG. 5, when the prioritization configuration input is set to logical level '1', the second wireless communication module is given priority over the first, so that if the second wireless communication module's request signal connection 234 is set to logical level '1', the first wireless communication module's enable connection 314 is disabled by forcing it to logical level '0'. In this case, the arbitration module operates similarly to that of Example 2, except that the priority of the wireless communication modules is reversed. In various embodiments, the prioritization configuration input 400 may originate from baseband processor 130, baseband processor 200 or a routing processor (not shown) connected to data path 120. The prioritization configuration input 400 may be directly or indirectly controlled by the host computer 100 so that the wireless communication module carrying the data deemed most time-sensitive, such as real-time voice or video data, is given priority. It will be obvious to those skilled in the art that other logic circuits will provide the equivalent logic function, including those using general-purpose electronics such as programmable logic device cells.

Example 4

Figure 6:
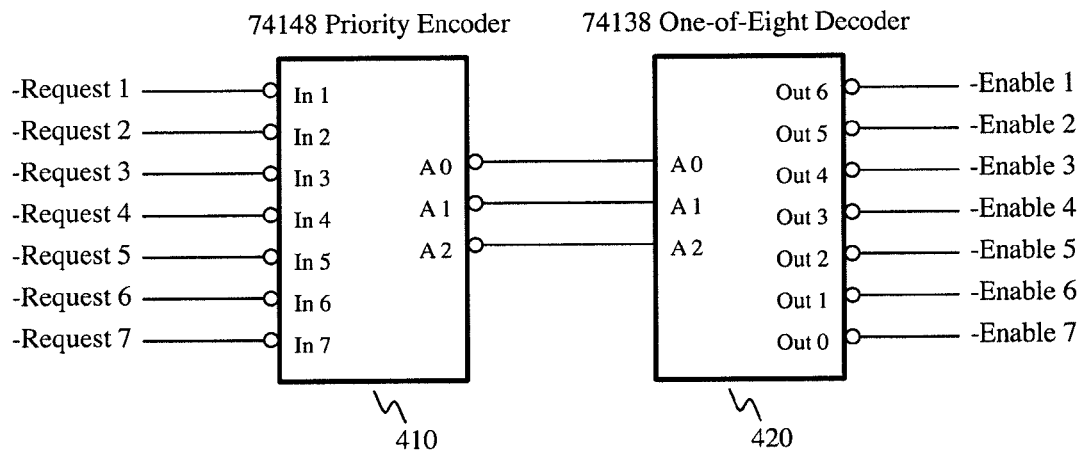
FIG. 6 illustrates an implementation for an arbitration module for controlling operation of wireless communication modules in accordance with an embodiment of the invention.

Referring to FIG. 6, an arbitration module according to an embodiment of the present invention comprises a priority encoder 410 and an address decoder 420 for implementing pre-emptive prioritization. The priority encoder 410 is illustrated as a standard 74148 integrated circuit 8:3 priority encoder having as its inputs up to seven request lines from different wireless communication modules. The 74148 priority encoder employs negative logic, so requests are made by wireless communication modules by driving their request line to a logical '0' or low level. The three output lines A0, A1, A2 of the priority encoder 410 are indicative of an inverted 3-bit value corresponding to the highest numbered input that is driven to a logical '0'. The three output lines A0, A1, A2 are connected to inputs A0, A1, A2 of a standard 74138 integrated circuit 3:8 address decoder 420. The address decoder outputs a logical '0' on a single output depending on the combination of inputs, also employing negative logic. In this case, output line 0 is connected to enable signal line 7, output line 1 is connected to enable signal line 6, and so on. The enable signal lines are used to enable the corresponding wireless communication modules to enter the requested higher-power state, a logical '0' level indicating that the state is enabled. A worker skilled in the art would readily understand other formats of priority encoders and compatible address decoders or functionally similar circuitry, hardware, software, and/or firmware that would be applicable for an arbitration module according to the present invention.

Example 5

Figure 7:
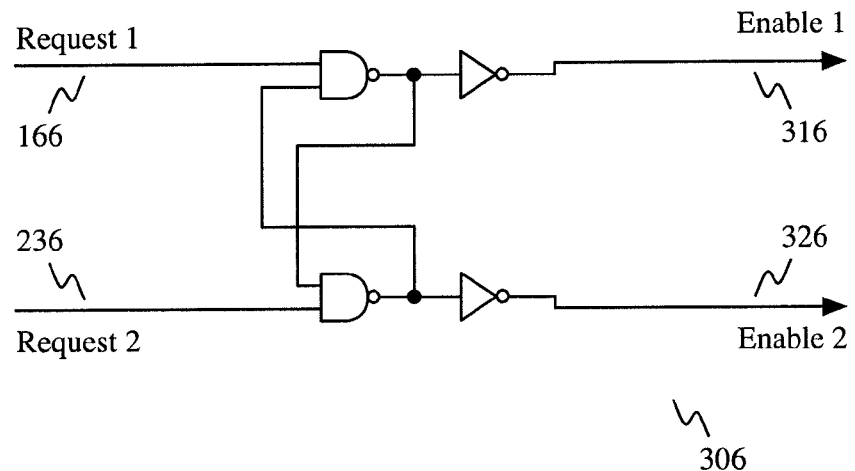
FIG. 7 illustrates an implementation for an arbitration module for controlling operation of wireless communication modules in accordance with an embodiment of the invention.

FIG. 7 illustrates another representation of the arbitration module 306 according to an embodiment of the present invention. The arbitration module 306 comprises digital logic that provides first-come first-served prioritization by way of a latching circuit or bistable multivibrator. As in Example 2, a logical level '1' at input 166 or 236 indicates a request by the first or second wireless communication module, respectively, to enable that wireless communication module to enter a higher-power state, for example by enabling the power amplifier thereof. A logical level '1' at output 316 or 326 indicates that the first or second wireless communication module is enabled to enter the higher-power state. If a request is made by either the first or second wireless communication module at a time when neither of the enable outputs are at a logical level '1', then the request is granted. If a request is made by either the first or second wireless communication module at a time when the request input of the other wireless communication module is at a logical level '1', then the request is blocked until the pre-existing request input returns to a logical level '0'. Therefore, for example, once either power amplifier 150 or 220 (as illustrated in FIG. 3) is enabled, it is given priority until it is disabled. It will be obvious to those skilled in the art that many logic circuits will provide the equivalent logic function, including those using general-purpose electronics such as programmable logic device cells.

Example 6

Figure 8A:
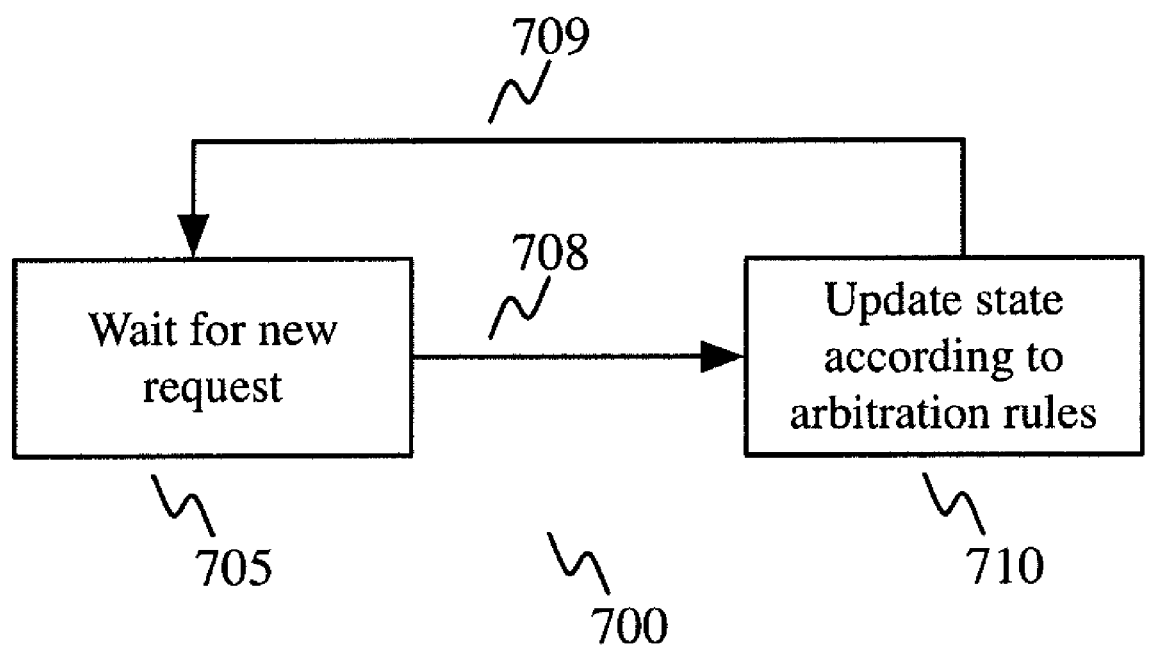
FIGS. 8A and 8B illustrate methods for providing plural wireless transceivers operating within a desired power budget in accordance with embodiments of the invention.
Figure 8B:
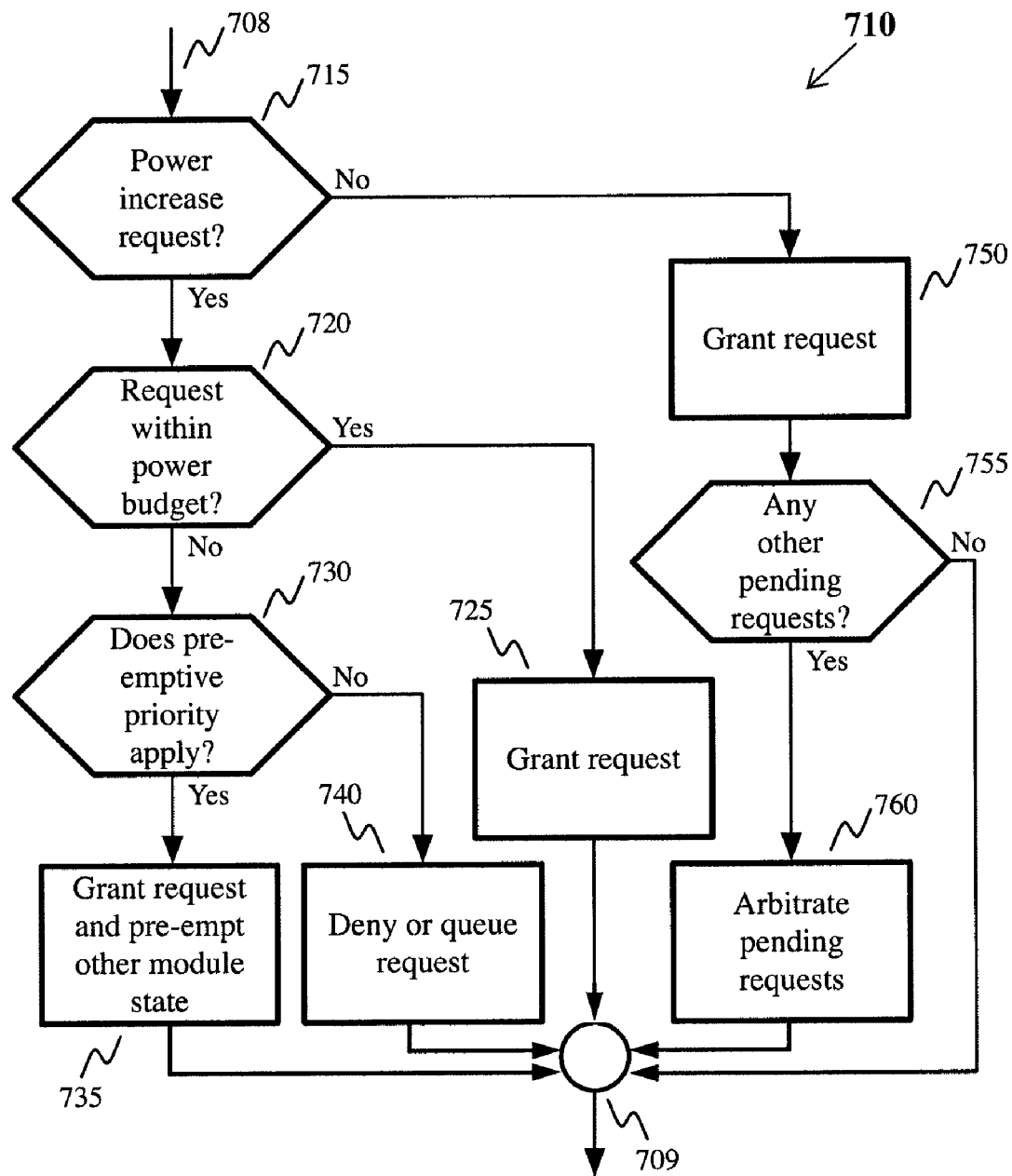

FIGS. 8A and 8B illustrate methods for providing plural wireless transceivers operating within a desired power budget in accordance with embodiments of the invention. FIG. 8A generally illustrates a method 700, wherein controlling which of a plurality of wireless communication modules are in a higher-power state includes use of a delay function 705, which waits for new requests from the plurality of wireless communication modules to change state. Upon being triggered 708 by such a request, the collective states of the wireless communication modules are updated according to predetermined arbitration rules 710. The method then returns 709 to waiting for new requests. In the present example, it is generally assumed that detection of requests is performed on a fine enough time scale that only one request occurs at a time. However, embodiments of the present invention are configured to handle multiple requests at a time if required. A request by a wireless communication module can be a digital signal, for example, indicative that the wireless communication module requires a change in its operational status. For example, each wireless communication module can have two or more of: a powered down state, standby state, receive-only state, low-power transmit/receive state, intermediate-power transmit/receive states, and high-power transmit/receive state. Like states of each wireless communication module may not necessarily draw the same amount of power.

FIG. 8B illustrates implementation of predetermined arbitration rules 710 according to an embodiment of the present invention. A new request 708 from a wireless communication module to change its state is first evaluated 715 to determine if granting the request would result in an increase or decrease in the amount of power drawn from the power source. For example, a request to enter a transmit/receive state from a standby or receive-only state would result in an increase in power draw, whereas a request to return to a standby or receive state from a transmit/receive state would result in a decrease. If the request is deemed to result in a power increase, an evaluation 720 is performed to determine whether granting the request is possible while respecting the power budget. For example, if the other wireless communication modules are in lower-power states then it is likely that the request can be granted without exceeding a predetermined maximum power draw. If granting the request is possible subject to the power budget, the request is granted 725 and the method returns to the delay function 705 through path 709.

Continuing with respect to FIG. 8B, if the current request 708 would result in a power increase not within the power budget, the current request and current collective state is examined 730 to determine if pre-emptive priority applies. For example, if the wireless communication module initiating the current request 708 has higher priority for its request than other wireless communication modules currently in states other than their lowest-power state, and if forcing one or more of these other wireless communication modules into lower power states would allow the current request 708 to be fulfilled within the power budget, then the current request 708 is granted at the expense of pre-empting one or more of said other wireless communication modules 735. Determining which other wireless communication modules to pre-empt may optionally involve prioritization, negotiation, scheduling, application of fairness conditions, or other operations. In addition, wireless communication modules whose activities are interrupted may optionally have new requests automatically enqueued so that they can resume their activities as soon as possible. If, in step 730, pre-emptive priority is determined to not apply, the current request 708 is denied, or enqueued so that it will be re-evaluated in the future, for example when more power capacity becomes available 740. Following this, the method returns to the delay function 705 through path 709.

Continuing further with respect to FIG. 8B, if the request 708 evaluated in step 715 is deemed to result in a power decrease, then the request is granted 750 since the power budget will not be exceeded in this case. This power decrease may provide opportunities for other pending requests (if any) to be granted. For example, previously denied requests resulting from first-come first-serve prioritization or interrupted activities for example as in step 735, may be held in one or more queues and evaluated in a predetermined order. To this end, the method provides for determining if any other requests are pending or enqueued 755. If there are no other pending requests, the method returns to the delay function 705 through path 709. If there are pending requests, these are prioritized and arbitrated 760. For example, pending requests may be arbitrated by another recursive or nested series of steps 710 as depicted in FIG. 8B. In one embodiment, pending requests may include other requests that would result in a power decrease, and these requests are granted immediately. In one embodiment, multiple pending requests can be evaluated and granted in step 760. Following this, the method returns to the delay function 705 through path 709.

Example 7

Figure 9:
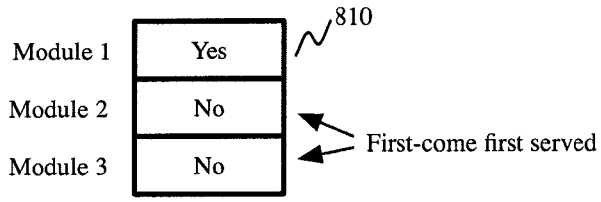
FIG. 9 illustrates a method for providing plural wireless transceivers operating within a desired power budget in accordance with an embodiment of the invention.

FIG. 9 illustrates a method for providing plural wireless transceivers operating within a desired power budget in accordance with an embodiment of the invention. Three wireless communication modules are provided with predetermined prioritization rules 810. Wireless communication module 1 is given pre-emptive priority over wireless communication modules 2 and 3. Wireless communication modules 2 and 3 operate according to first-come first-served priority with respect to each other. Each wireless communication module is operable in a lower-power standby state S, and a higher-power transmit/receive state T. The power budget is such that only one wireless communication module can operate in the transmit/receive state T at a time. Collective states are represented by an ordered triple, such as (S,T,S), where the first, second and third element of the triple represents the state of wireless communication modules 1, 2, and 3, respectively. Other variations are also contemplated, such as involving more than two states per module, and allowing plural modules to be in higher power states.

Continuing with respect to FIG. 9, the prioritization rules 810 can be encoded in a state transition table 850, useful for controlling which of the plurality of wireless communication modules are in the higher-power transmit/receive state. Each row of the table 850 represents a current collective state, while each column represents a possible subsequent collective state. A '1' entry in the table indicates that the transition from the collective state in the corresponding row to the collective state in the corresponding column is permitted, while a '0' entry indicates that the transition is prohibited. For example, state (S,T,S) can transition to state (S,S,S) if wireless communication module 2 returns to standby mode. State (S,T,S) can also transition to state (T,S,S) if wireless communication module 1 enters transmit/receive mode, pre-empting wireless communication module 2. The table 850 may be further regarded as an adjacency matrix for a directed graph of collective states, as would be readily understood by a worker skilled in the art. In the present example, it is assumed that the state of only one wireless communication module may change at a time. If two or more modules attempt to concurrently transition between states, further arbitration, such as performing the transitions in a predefined sequence or utilizing other collision resolution methods, may be required.

Example 8

Figure 10:
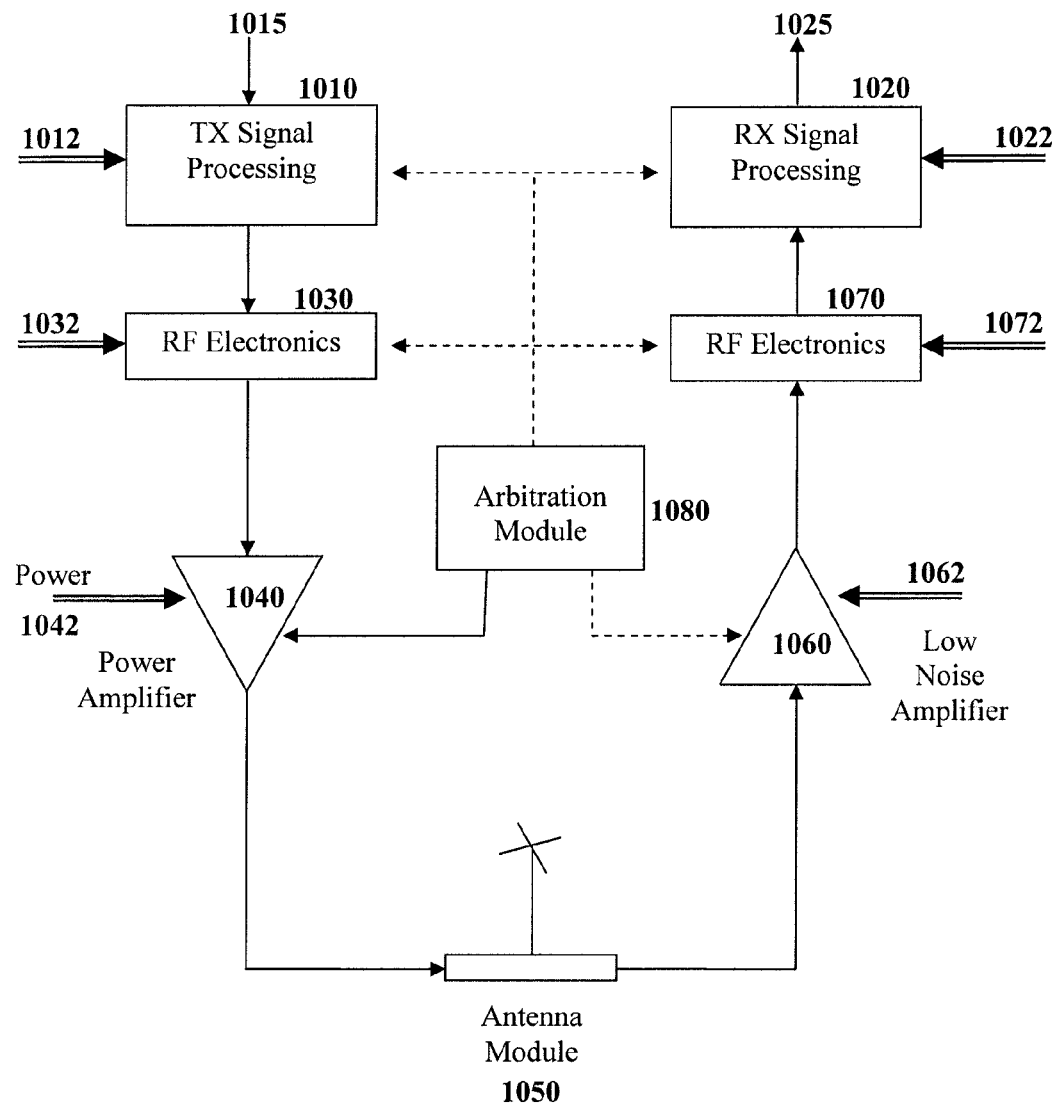
FIG. 10 illustrates a wireless communication module and arbitration module of a wireless communication apparatus in accordance with embodiments of the invention.

FIG. 10 generally illustrates a wireless communication module operatively coupled to an arbitration module in accordance with embodiments of the invention. The wireless communication module includes transmitter and receiver signal processing electronics 1010 and 1020, respectively. The transmitter signal processing electronics 1010 processes an encoded or unencoded stream of data to be transmitted 1015 and provides an encoded signal in accordance with a wireless transmission protocol for which the wireless communication module is configured. The stream 1015 may be received from an external information source, for example, or generated internally as control data for maintaining a communication session. The encoded signal from the electronics 1010 is further processed using radio frequency (RF) electronics 1030, such as RF mixers, filters, and the like. The further processed output of electronics 1030 is amplified by a RF power amplifier 1040 and the amplified signal is transmitted wirelessly using an antenna module 1050. The antenna module 1050 may also receive radio signals which are amplified by a low-noise amplifier 1060. The amplified received signals may be further processed by RF electronics 1070, such as RF mixers, filters, and the like. The processed signal is then provided to the receiver signal processing electronics 1020, which partially or fully decodes the signal to provide a received data stream 1025.

FIG. 10 further illustrates an arbitration module 1080. In the present embodiment, the arbitration module 1080 is operatively coupled at least to the RF power amplifier 1040, and possibly to one or more other components, such as electronics 1010, 1020, 1030, 1070 and amplifier 1060. Furthermore, power is supplied to each of the components 1010, 1020, 1030, 1040, 1060, and 1070 by power pathways 1012, 1022, 1032, 1042, 1062, and 1072, respectively. In this embodiment, the RF power amplifier is operable in a lower-power state and a higher-power state, with operation in these states controllable by the arbitration module 1080. Therefore, the RF power amplifier 1040 may be controlled to consume variable power from the power pathway 1042, resulting in controllable power draw by the wireless communication module from the power source. Likewise, other components may draw substantially fixed or controllably variable power. In one embodiment, when components such as the power amplifier 1040 are in a lower-power state, wireless transmission is disabled. In this case, the data stream 1015 may be controllably suspended or buffered when transmission is disabled. The arbitration module 1080 may also be operatively coupled to one or more other wireless communication modules, thereby enabling control of power delivered to the plurality of wireless communication modules.

Example 9

Figure 11:
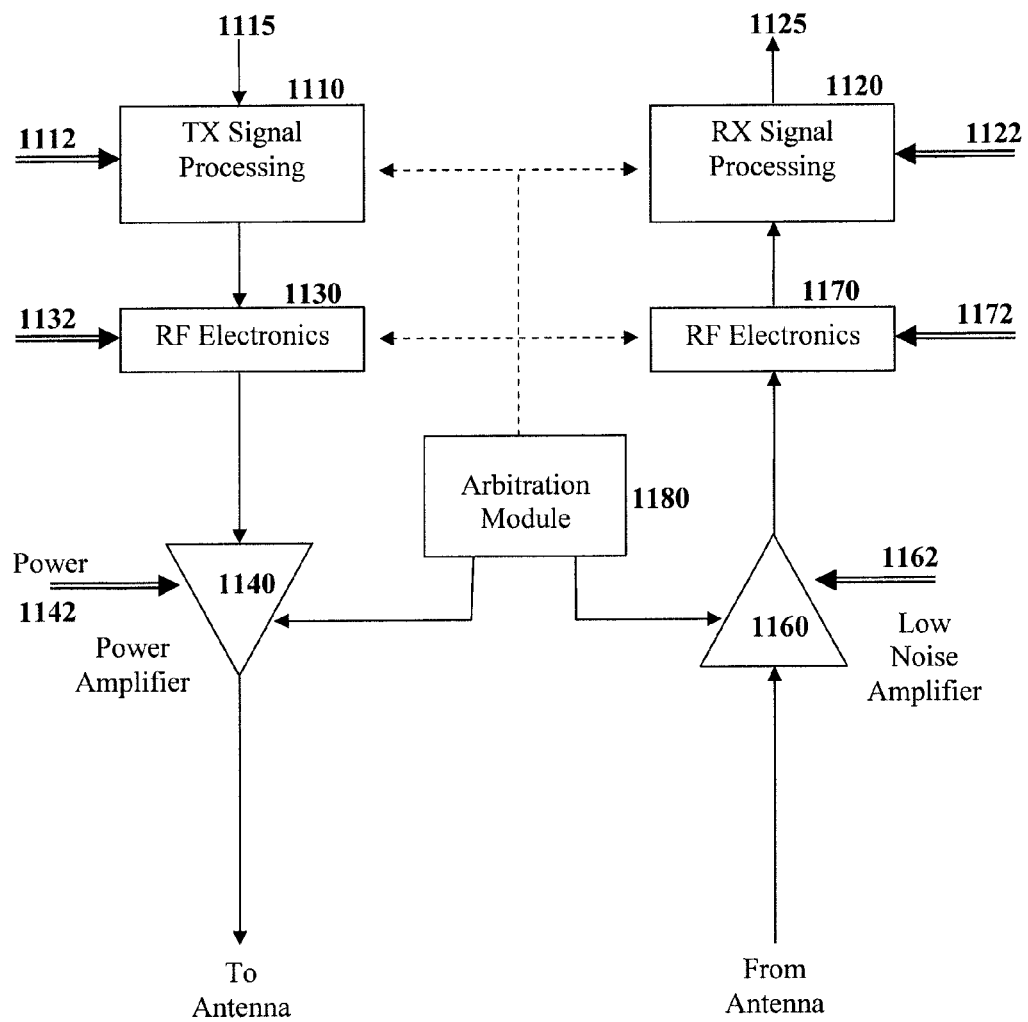
FIG. 11 illustrates an arbitration module operatively coupled to components of one or more wireless communication modules of a wireless communication apparatus in accordance with embodiments of the invention.

FIG. 11 generally illustrates an arbitration module 1180 operatively coupled to wireless communication components of one or more wireless communication modules of a wireless communication apparatus in accordance with embodiments of the invention.

A first set of wireless communication components are configured to facilitate wireless transmission. These include transmitter signal processing electronics 1110, radio frequency (RF) electronics 1130, and an RF power amplifier 1140. The transmitter signal processing electronics 1110 processes an encoded or unencoded stream of data 1115 to be transmitted and provides an encoded signal in accordance with a wireless transmission protocol. The stream of data 1115 may be received from an external information source, for example, or generated internally as control data for maintaining a communication session. The encoded signal from the electronics 1110 is further processed using the RF electronics 1130, such as RF mixers, filters, and the like. The further processed output of electronics 1130 is amplified by the RF power amplifier 1140 and the amplified signal is transmitted wirelessly using a dedicated or shared antenna.

For reception, a dedicated or shared antenna, for example shared with the RF power amplifier 1140, receives radio signals which are amplified by a low-noise amplifier 1160. The amplified received signals may be further processed by RF electronics 1170, such as RF mixers, filters, and the like. The processed signal is then provided to the receiver signal processing electronics 1120, which partially or fully decodes the signal to provide a received data stream 1125.

The transmitter signal processing electronics 1110, RF electronics 1130 and RF power amplifier 1140 are part of a wireless communication module. The receiver signal processing electronics 1120, RF electronics 1170 and low noise amplifier 1160 may be part of the same wireless communication module or a different wireless communication module.

The arbitration module 1180 may be operatively coupled to the RF power amplifier 1140 and the low noise amplifier 1160. The arbitration module 1180 may additionally or alternatively be operatively coupled to other components, such as electronics 1110, 1120, 1130, 1170. Furthermore, power is supplied to each of the components 1110, 1120, 1130, 1140, 1160, and 1170 by power pathways 1112, 1122, 1132, 1142, 1162, and 1172, respectively.

The RF power amplifier 1140 may be operable in a lower-power state and a higher-power state, with operation in these states controllable by the arbitration module 1180. Therefore, the RF power amplifier 1140 may be controlled to consume variable power from the power pathway 1142, resulting in controllable power draw by the RF power amplifier 1140 from the power source. Likewise, other components may draw substantially fixed or controllably variable power. For example, the low noise amplifier 1160 may be configured to consume variable power, or may be turned on when sufficient power is unavailable, or the like.

In some embodiments, when components such as the RF power amplifier 1140 are in a lower-power state, power may be supplied to the low-noise amplifier 1160 and/or other components used for reception and associated with the low-noise amplifier 1160. The arbitration module 1180 may thereby operate to divert at least a portion of power otherwise used for radio transmission to facilitate radio reception, at least temporarily, while respecting a desired power budget.

Example 10

Figure 12:
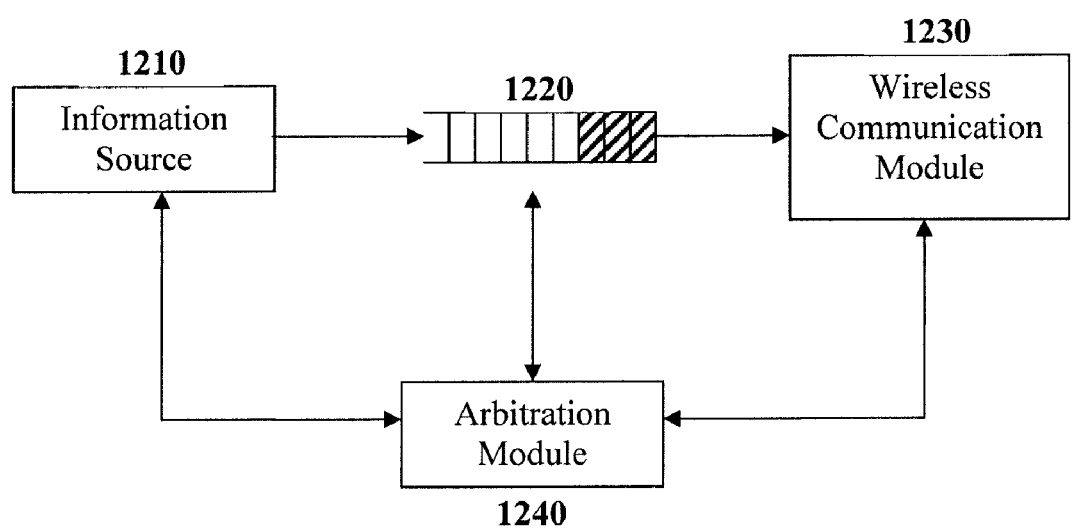
FIG. 12 illustrates an information source operatively coupled to a wireless communication module via a queue, and an arbitration module, in accordance with embodiments of the invention.

FIG. 12 illustrates an information source 1210 operatively coupled to provide data packets for transmission by a wireless communication module 1230 via an intermediate buffer or queue 1220, in accordance with some embodiments of the invention. The information source 1210 may be aboard a host computer system, for example. The queue 1220 may be aboard the host computer system or the wireless communication device. The queue 1220 may facilitate regulation or control of data packets provided by the information source 1210, for example by releasing data packets from the queue at a predetermined or controllable rate. An arbitration module 1240 may be operatively coupled to the information source 1210, queue 1220, and wireless communication module 1230. For example, the arbitration module 1240 may react to signals from the information source 1210 indicative of a request or indication that the wireless communication module 1230 should be activated. The arbitration module 1240 may further provide signals to the information source 1210 to influence the flow of data packets therefrom. The arbitration module 1240 may further monitor queue 1220 length and rate of packet inflow or outflow, or adjust the outflow rate. The arbitration module 1240 may further monitor operation of the wireless communication module 1230 and control whether the module is in a lower-power or higher-power state. Control and monitoring of each of components 1210, 1220, and 1230, and other components of the wireless communication module, may be interdependent to facilitate desired interoperation of plural system components.

Example 11

Figure 13:
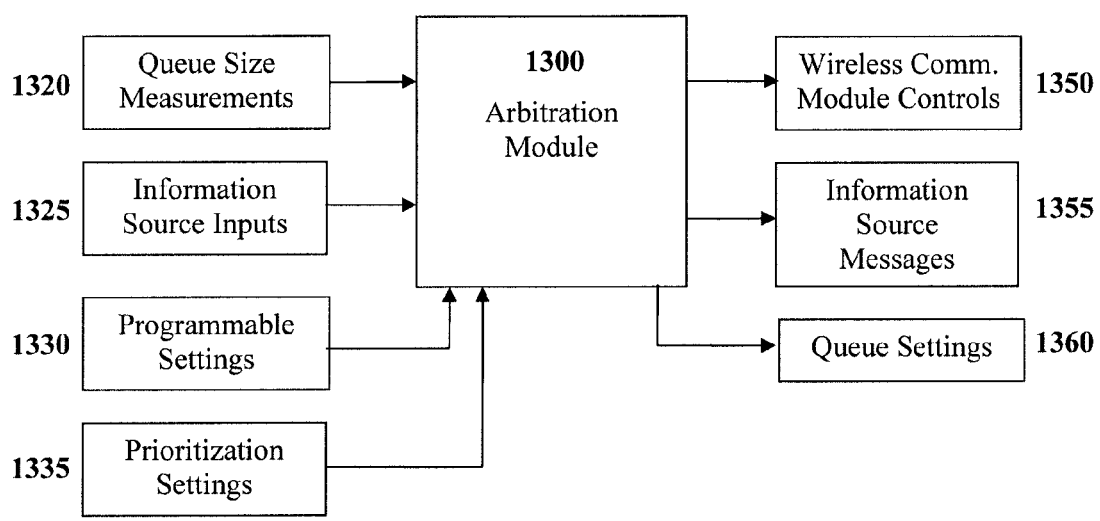
FIG. 13 illustrates an arbitration module in accordance with embodiments of the invention.

FIG. 13 illustrates an arbitration module 1300 operatively coupled to various inputs and outputs in accordance with embodiments of the invention. All or some of these inputs and outputs may be provided in various embodiments. Potential arbitration module inputs include: queue size measurements 1320, information source inputs 1325 such as transmission requests or notifications, programmable settings 1330 such as user preferences, and prioritization settings 1335 such as rules for prioritizing different communication sessions using different wireless communication modules. Potential arbitration module outputs include: wireless communication module controls 1350, information source controls or messages 1355, and queue setting controls 1360.

Embodiments of the present invention can provide for arbitration modules related to those described above, for example in Examples 2 to 5. For example, cascaded stages of arbitration modules, parallel and/or interconnected arbitration module portions, or the like, can be provided in accordance with the present invention.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a semiconductor memory, gate array, quantum interference device, magnetic or optical crystal, tape or disc, or the like, for storing signals readable by a machine, for controlling the operation of a computer and/or firmware according to the method of the invention and/or to structure its components in accordance with the system of the invention.

In addition, while portions of the above discuss the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like, or system of computers, and pursuant to one or more, or a part of one or more, program elements, modules or objects generated from any programming language, such as C, assembler, C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A wireless communication apparatus comprising:
   a) a plurality of wireless communication modules, each of the plurality of wireless communication modules configured to operate as a transceiver and having a lower-power state and a higher-power state, wherein at least one of the wireless communication modules communicates using a first wireless communication protocol and at least one of the wireless communication modules communicates using a second wireless communication protocol;
   b) a power source operatively coupled to the plurality of wireless communication modules for delivering power thereto; and
   c) an arbitration module operatively coupled to the plurality of wireless communication modules, the arbitration module configured to control which of the plurality of wireless communication modules are in the higher-power state, thereby controlling total power delivered by the power source to the plurality of wireless communication modules.

2. The wireless communication apparatus of claim 1, wherein controlling which of the plurality of wireless communication modules are in the higher-power state includes enabling predetermined portions of electronics thereof.

3. The wireless communication apparatus of claim 2, wherein the predetermined portions of electronics include power amplifiers.

4. The wireless communication apparatus of claim 1, wherein at least one of the plurality of wireless communication modules, when in the lower power state, is operable only for one or more operations selected from the group consisting of: radio reception and radio scanning.

5. The wireless communication apparatus of claim 1, wherein the arbitration module is configured to control states of the plurality of wireless communication modules based on one or more prioritization rules.

6. The wireless communication apparatus of claim 5, wherein at least one of the one or more prioritization rules is determined based on one or more prioritization configuration inputs.

7. The wireless communication apparatus of claim 6, wherein the one or more prioritization configuration inputs are determined based on one or more communication requirements.

8. The wireless communication apparatus of claim 1, wherein the arbitration module is configured to maintain total power delivered by the power source to the plurality of wireless communication modules within a desired power budget.

9. The wireless communication apparatus of claim 1, wherein the arbitration module is further configured to control total power delivered by the power source to the plurality of wireless communication modules based at least in part on a time-varying control schedule.

10. The wireless communication apparatus of claim 1, wherein the arbitration module is at least in part integral with one or more of the plurality of wireless communication modules.

11. The wireless communication apparatus of claim 1, wherein controlling which of the plurality of wireless communication modules are in the higher-power state includes limiting power consumption of one or more of the plurality of wireless communication modules.

12. The wireless communication apparatus of claim 11, wherein limiting power consumption of at least one of the plurality of wireless communication modules comprises limiting one or more maximum transmission power levels associated with one or more communication frequency bands thereof.

13. A wireless communication apparatus comprising:
   a) a plurality of wireless communication modules, each of the plurality of wireless communication modules having a lower-power state and a higher-power state;
   b) a power source operatively coupled to the plurality of wireless communication modules for delivering power thereto; and
   c) an arbitration module operatively coupled to the plurality of wireless communication modules, the arbitration module configured to control which of the plurality of wireless communication modules are in the higher-power state, thereby controlling total power delivered by the power source to the plurality of wireless communication modules;
   wherein at least one of the one or more prioritization rules is selected from the group consisting of: pre-emptive prioritization rules, non-pre-emptive prioritization rules, and first-come first-served prioritization rules.

14. A wireless communication apparatus comprising:
   a) a plurality of wireless communication modules, each of the plurality of wireless communication modules having a lower-power state and a higher-power state;
   b) a power source operatively coupled to the plurality of wireless communication modules for delivering power thereto; and
   c) an arbitration module operatively coupled to the plurality of wireless communication modules, the arbitration module configured to control which of the plurality of wireless communication modules are in the higher-power state, thereby controlling total power delivered by the power source to the plurality of wireless communication modules;
   wherein the power source is associated with a host computing device, the plurality of wireless communication modules are associated with a wireless adapter, and the host computing device and the wireless adapter are operatively coupled through an interface selected from the group consisting of: a USB™ interface, a Firewire™ interface, a PCMCIA™ interface, and a CardBus™ interface.

15. A wireless communication apparatus comprising:
   a) a plurality of wireless communication modules, each of the plurality of wireless communication modules having a lower-power state and a higher-power state;
   b) a power source operatively coupled to the plurality of wireless communication modules for delivering power thereto; and
   c) an arbitration module operatively coupled to the plurality of wireless communication modules, the arbitration module configured to control which of the plurality of wireless communication modules are in the higher-power state, thereby controlling total power delivered by the power source to the plurality of wireless communication modules;
   wherein the arbitration module is configured to receive one or more requests to change a collective state of the wireless communication modules, the arbitration module further configured to automatically generate a response to said one or more requests, the response including one or more signals for controlling which of the plurality of wireless communication modules are in the higher-power state.

16. The wireless communication apparatus of claim 15, wherein the arbitration module includes a Boolean logic network for generating said response.

17. The wireless communication apparatus of claim 15, wherein the arbitration module includes one or more latching circuits.

18. A method for providing a plurality of wireless communication capabilities within a desired power budget, the method comprising:
   a) providing a plurality of wireless communication modules associated with the plurality of wireless communication capabilities, each of the plurality of wireless communication modules configured to operate as a transceiver and having at least a lower-power state and a higher-power state and at least one of the wireless communication modules communicates using a first wireless communication protocol and at least one of the wireless communication modules communicates using a second wireless communication protocol, each of the plurality of wireless communication modules operatively coupled to a power source to receive power therefrom; and
   b) controlling which of the plurality of wireless communication modules are in the higher-power state, thereby controlling total power delivered by the power source to the plurality of wireless communication modules.

19. The method of claim 18, wherein controlling which of the plurality of wireless communication modules are in the higher-power state includes enabling predetermined portions of electronics thereof.

20. The method of claim 18, wherein at least one of the provided plurality of wireless communication modules, when in the lower power state, is operable only for one or more operations selected from the group consisting of: radio reception and radio scanning.

21. The method of claim 18, wherein controlling total power delivered by the power source to the plurality of wireless communication modules includes maintaining total power delivered by the power source to the plurality of wireless communication modules within a desired power budget.

22. The method of claim 18, wherein controlling states of the plurality of wireless communication modules is based on one or more prioritization rules.

23. The method of claim 22, further comprising: configuring the prioritization rules based on one or more requirements selected from the group consisting of: communication requirements and power budget requirements.

24. The method of claim 18, wherein controlling total power delivered by the power source to the plurality of wireless communication modules is based at least in part on a control schedule.

25. The method of claim 18, wherein controlling which of the plurality of wireless communication modules are in the higher-power state includes limiting power consumption of one or more of the plurality of wireless communication modules.

26. The method of claim 25, wherein limiting power consumption of at least one of the plurality of wireless communication modules comprises limiting one or more maximum transmission power levels associated with one or more communication frequency bands thereof.

27. A method for providing a plurality of wireless communication capabilities within a desired power budget, the method comprising:
  a) providing a plurality of wireless communication modules associated with the plurality of wireless communication capabilities each of the plurality of wireless communication modules having at least a lower-power state and a higher-power state, each of the plurality of wireless communication modules operatively coupled to a power source to receive power therefrom; and
  b) controlling which of the plurality of wireless communication modules are in the higher-power state, thereby controlling total power delivered by the power source to the plurality of wireless communication modules;
  wherein at least one of the one or more prioritization rules is selected from the group consisting of: pre-emptive prioritization rules, non-pre-emptive prioritization rules, and first-come first-served prioritization rules.

28. A method for providing a plurality of wireless communication capabilities within a desired power budget, the method comprising:
  a) providing a plurality of wireless communication modules associated with the plurality of wireless communication capabilities, each of the plurality of wireless communication modules having at least a lower-power state and a higher-power state, each of the plurality of wireless communication modules operatively coupled to a power source to receive power therefrom; and
  b) controlling which of the plurality of wireless communication modules are in the higher-power state, thereby controlling total power delivered by the power source to the plurality of wireless communication modules;
  wherein controlling states of the plurality of wireless communication modules includes: receiving one or more requests to change a collective state of the wireless communication modules, and generating a response to said one or more requests, the response including one or more signals for controlling which of the plurality of wireless communication modules are in the higher-power state.

29. A computer program product comprising a computer readable medium having recorded thereon statements and instructions for execution by a computer to carry out a method for operating a plurality of wireless communication capabilities, each of the plurality of wireless communication modules operatively coupled to a power source to receive power therefrom, the method comprising: controlling which of the plurality of wireless communication modules are in a higher-power state and controlling which of the plurality of wireless communication modules are in a lower-power state, thereby controlling total power delivered by the power source to the plurality of wireless communication modules, wherein each wireless communication module is configured to operate as a transceiver and wherein at least one of the wireless communication modules communicates using a first wireless communication protocol and at least one of the wireless communication modules communicates using a second wireless communication protocol.

30. The computer program product of claim 29, wherein controlling which of the plurality of wireless communication modules are in the higher-power state includes enabling predetermined portions of electronics thereof.

31. The computer program product of claim 29, wherein controlling total power delivered by the power source to the plurality of wireless communication modules includes maintaining total power delivered by the power source to the plurality of wireless communication modules within a desired power budget.

32. The computer program product of claim 29, wherein controlling states of the plurality of wireless communication modules is based on one or more prioritization rules.

33. The computer program product of claim 32, the method further comprising: configuring the prioritization rules based on one or more requirements selected from the group consisting of: communication requirements and power budget requirements.

34. The computer program product of claim 29, wherein controlling states of the plurality of wireless communication modules includes: receiving one or more requests to change a collective state of the wireless communication modules, and generating a response to said one or more requests, the response configured to control which of the plurality of wireless communication modules are in the higher-power state and which of the plurality of wireless communication modules are in the lower-power state.

35. A computer program product comprising a computer readable medium having recorded thereon statements and instructions for execution by a computer to carry out a method for operating a plurality of wireless communication capabilities, each of the plurality of wireless communication modules operatively coupled to a power source to receive power therefrom, the method comprising: controlling which of the plurality of wireless communication modules are in a higher-power state and controlling which of the plurality of wireless communication modules are in a lower-power state, thereby controlling total power delivered by the power source to the plurality of wireless communication modules, wherein at least one of the one or more prioritization rules is selected from the group consisting of: pre-emptive prioritization rules, non-pre-emptive prioritization rules, and first-come first-served prioritization rules.

* * * * *